United States Patent
Parrucci et al.

(10) Patent No.: US 11,522,737 B2
(45) Date of Patent: *Dec. 6, 2022

(54) SYSTEMS AND METHODS FOR AUTOMATIC LEVEL CONTROL

(71) Applicant: CommScope Technologies LLC, Hickory, NC (US)

(72) Inventors: Marco Parrucci, S. Michele (IT); Enrico Maria Fabbri, Forli (IT); Samuele Brighenti, Faenza (IT)

(73) Assignee: CommScope LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,285

(22) Filed: Apr. 29, 2021

(65) Prior Publication Data

US 2021/0250209 A1    Aug. 12, 2021

Related U.S. Application Data

(63) Continuation of application No. 16/934,965, filed on Jul. 21, 2020, now Pat. No. 11,025,459, which is a
(Continued)

(51) Int. Cl.
| | |
|---|---|
| *H04L 27/08* | (2006.01) |
| *H04L 25/03* | (2006.01) |
| *H04B 17/318* | (2015.01) |

(52) U.S. Cl.
CPC ..... *H04L 25/03828* (2013.01); *H04B 17/318* (2015.01)

(58) Field of Classification Search
CPC .................. H04L 25/03828; H04B 17/318
(Continued)

(56) References Cited

U.S. PATENT DOCUMENTS

| | | | |
|---|---|---|---|
| 4,612,545 A | 9/1986 | Asendorf et al. | |
| 5,722,061 A * | 2/1998 | Hutchison, IV | ..... H03G 1/0088 |
| | | | 455/240.1 |

(Continued)

FOREIGN PATENT DOCUMENTS

| | | |
|---|---|---|
| EP | 2297851 B1 | 3/2013 |
| EP | 3048725 A2 | 7/2016 |
| KR | 20050054442 A | 6/2005 |

OTHER PUBLICATIONS

International Searching Authority, "International Search Report and Written Opinion from PCT Application No. PCT/US2019/060317", from Foreign Counterpart to U.S. Appl. No. 16/677,403, dated Apr. 9, 2020, pp. 1 through 9, Published: WO.

(Continued)

*Primary Examiner* — Don N Vo
(74) *Attorney, Agent, or Firm* — Fogg & Powers LLC

(57) ABSTRACT

Systems and methods for automatic level control (ALC) are provided. In one embodiment, an ALC system for communications signals comprises: a multi-threshold programmable ALC controller; and at least one signal path that includes: a digital step attenuator configured to receive an analog communications signal and attenuate the analog communications signal in response to an attenuation adjustment signal from the ALC controller; and an analog-to-digital converter configured to receive the analog communications signal as attenuated by the digital step attenuator and generate samples of the attenuated analog communications signal, wherein the ALC controller receives the samples. The ALC controller comprises a plurality of clip detectors that function in parallel. Each of the clip detectors are programmed with a respective amplitude and time threshold. Based on which of the plurality of clip detectors determine that the samples exceed their respective amplitude
(Continued)

and time threshold, the ALC controller generates the attenuation adjustment signal.

20 Claims, 13 Drawing Sheets

Related U.S. Application Data continuation of application No. 16/677,403, filed on Nov. 7, 2019, now Pat. No. 10,771,293.

(60) Provisional application No. 62/776,851, filed on Dec. 7, 2018.

(58) Field of Classification Search
USPC .................................................. 375/232, 345
See application file for complete search history.

(56) References Cited

U.S. PATENT DOCUMENTS

| | | | |
|---|---|---|---|
| 7,277,510 | B1 | 10/2007 | Kilani et al. |
| 9,414,399 | B2 | 8/2016 | Eyuboglu et al. |
| 9,748,906 | B2 | 8/2017 | Stewart et al. |
| 10,771,293 | B2 | 9/2020 | Parrucci et al. |
| 11,025,459 | B2 * | 6/2021 | Parrucci ............... H04B 17/318 |
| 2001/0048727 | A1 | 12/2001 | Schmutz et al. |
| 2004/0081235 | A1 | 4/2004 | Buchali |
| 2012/0177148 | A1 | 7/2012 | Flamant et al. |
| 2013/0003889 | A1 | 1/2013 | Earls |
| 2014/0169417 | A1 | 6/2014 | Buescher et al. |
| 2015/0263688 | A1 | 9/2015 | Nicolino, Jr. et al. |
| 2017/0149465 | A1 | 5/2017 | Kurchuk |
| 2017/0163232 | A1 | 6/2017 | Mimino |
| 2019/0379977 | A1 | 12/2019 | Büttner et al. |
| 2020/0351131 | A1 | 11/2020 | Parrucci et al. |

OTHER PUBLICATIONS

U.S. Patent and Trademark Office, "Ex Parte Quayle", U.S. Appl. No. 16/677,103, Apr. 23, 2020, pp. 1 through 12, Published: US.

U.S. Patent and Trademark Office, "Notice of Allowance", U.S. Appl. No. 16/677,403, dated Jun. 8, 2020, pp. 1 through 9, Published: US.

U.S. Patent and Trademark Office, "Notice of Allowance", U.S. Appl. No. 16/934,965, dated Mar. 19, 2021, pp. 1 through 5, Published: US.

U.S. Patent and Trademark Office, "Office Action", U.S. Appl. No. 16/934,965, dated Feb. 1, 2021, pp. 1 through 13, Published: US.

European Patent Office, "Extended European Search Report from EP Application No. 19892773.3", from Foreign Counterpart to U.S. Appl. No. 16/677,403, dated Aug. 3, 2022, pp. 1 through 13, Published: EP.

* cited by examiner

SYSTEMS AND METHODS FOR AUTOMATIC LEVEL CONTROL

CROSS-REFERENCE TO RELATED APPLICATIONS

This U.S. Patent Application is a Continuation Application of U.S. patent application Ser. No. 16/934,965, titled "SYSTEMS AND METHODS FOR AUTOMATIC LEVEL CONTROL" filed on Jul. 21, 2020, which is a Continuation Application of U.S. patent application Ser. No. 16/677,403, titled "SYSTEMS AND METHODS FOR AUTOMATIC LEVEL CONTROL" filed on Nov. 7, 2019, which claims priority to, and the benefit of, U.S. Provisional Patent Application No. 62/776,851, titled "SYSTEMS AND METHODS FOR AUTOMATIC LEVEL CONTROL" and filed on Dec. 7, 2018, each of which are incorporated by reference herein in their entirety.

BACKGROUND

Automatic Level Control (ALC) is used in cellular communications system to prevent components in the signal paths from being overdriven by incoming radio frequency (RF) signals. For example, a typical RF cellular communications system would provide bidirectional data transfer between a Base Station (BS) and one or more mobile user devices. The data path for communication from the base station to the mobile user devices is the Down Link path (DL). The data path for communication from the mobile user devices to the base station is the uplink path (UL). Whereas the downlink data path is well controlled by the system, the uplink path can be overdriven by a mobile user device that is close to the antenna and transmitting high power. Implementing uplink automatic level control can prevent strong uplink signals from mobile user devices from overdriving uplink path components, which would result in clipping of the uplink signals. ALC as now typically implemented in cellular communications system functions by sampling and monitoring peak signal levels of the incoming uplink RF signals to determine when those peaks exceed permitted threshold levels. When this occurs, the incoming uplink signals are attenuated to maintain the peak signals levels below the permitted threshold levels. One problem with this approach occurs when the incoming RF signal has a high peak-to-average power ratio. More specifically, ALC interventions to increase attenuation will be triggered more frequently for RF signals with a high peak-to-average power ratio than for a low peak-to-average power ratio, thus attenuating the incoming RF signal at different average signal levels.

SUMMARY

The Embodiments of the present disclosure provide methods and systems for automatic level control and will be understood by reading and studying the following specification.

In one embodiment, an automatic level control (ALC) system for communications signals comprises: a multi-threshold programmable ALC controller; and at least one signal path that includes: a digital step attenuator configured to receive an analog communications signal and attenuate the communications signal in response to an attenuation adjustment signal from the multi-threshold programmable ALC controller; and an analog-to-digital converter configured to receive the communications signal as attenuated by the digital step attenuator, wherein the multi-threshold programmable ALC controller receives complex IQ samples of the attenuated communication signal; wherein the multi-threshold programmable ALC controller comprises a plurality of clip detectors that function in parallel, wherein each of the plurality of clip detectors are programmed with a respective amplitude and time threshold, wherein based on which of the plurality of clip detectors determine that the complex IQ samples exceed their respective amplitude and time threshold, the multi-threshold programmable ALC controller generates the attenuation adjustment signal to the digital step attenuator.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized, and that logical, mechanical, and electrical changes may be made without departing from the scope of the present disclosure. The following detailed description is, therefore, not to be taken in a limiting sense.

Embodiments of the present disclosure introduce systems and methods for Automatic Level Control (ALC) that utilize multiple programmable thresholds to determine when an ALC intervention to increase attenuation should be triggered. The programmable thresholds are defined and implemented a function of both signal power levels and the duration of time a signal is at or above a specified limit. More specifically, in some of the embodiments described herein, the programmable thresholds are defined in terms of the Complementary Cumulative Distribution Function (CCDF) of a modulated signal that analyzed to determine how much time the signal spends at or above a given power level. Moreover, this analysis can be simultaneously performed in parallel for thresholds associated with different power levels. The CCDF analysis for a higher power level may be conducted over a fewer number of RF signal samples as compared to a CCDF analysis for a relatively lower power level, so that an ALC intervention may be implemented for a relatively stronger incoming RF signal more quickly if needed. Because operation of a Time Division Duplexing (TDD) cellular communications system will alternate between uplink and downlink transmission modes, the CCDF analysis of uplink signals may be paused during periods of downlink transmissions (where no scheduled uplink transmissions are expected) and resumed when the communication system switches back to transporting uplink communications. Moreover, in different embodiments, the ALC disclosed herein may be implemented for a single incoming band, or individually implemented for multiple bands of incoming RF signals.

Figure 1:
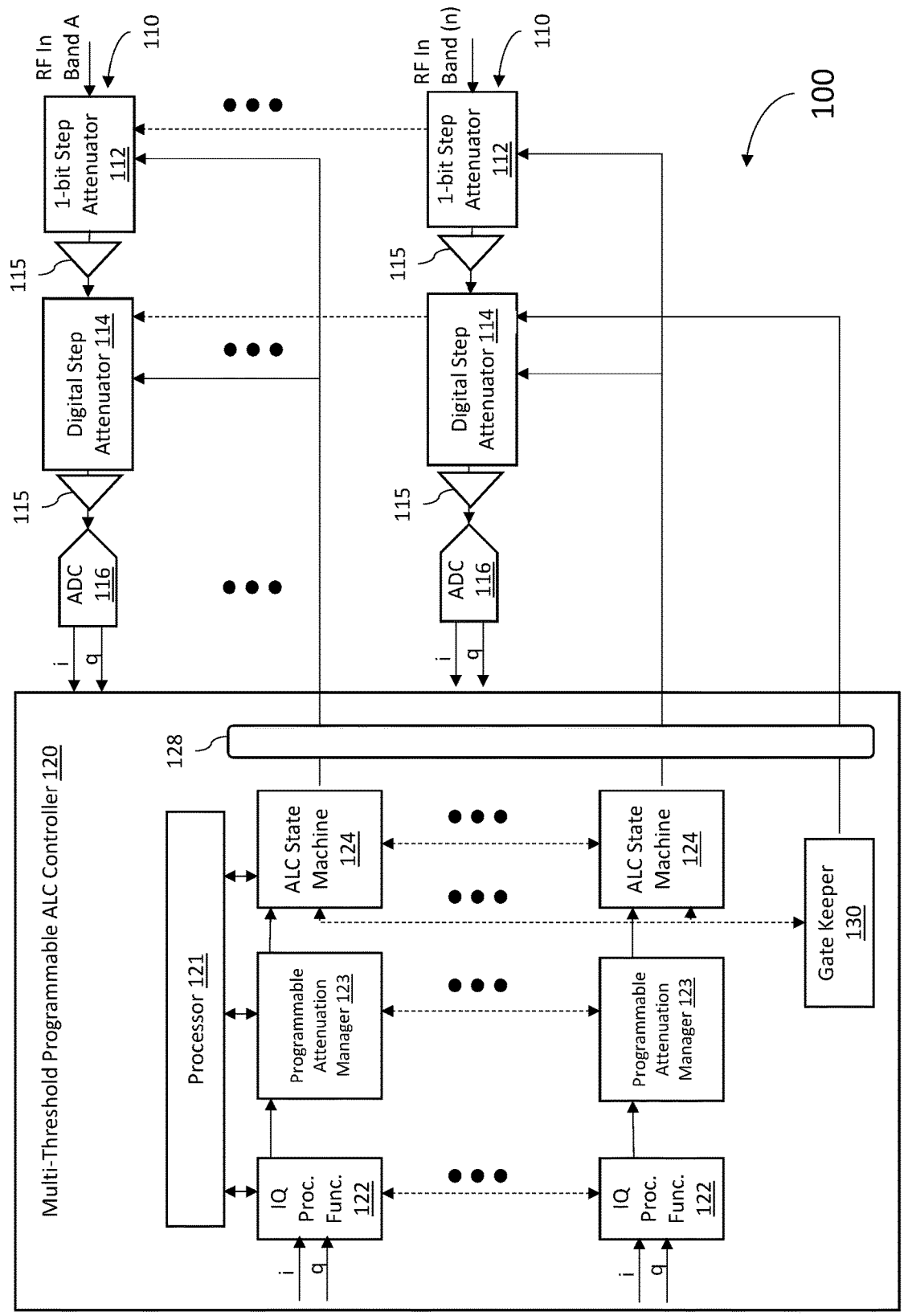
FIG. 1 is a diagram illustrating an example automatic level control system embodiment.
Figure 1A:
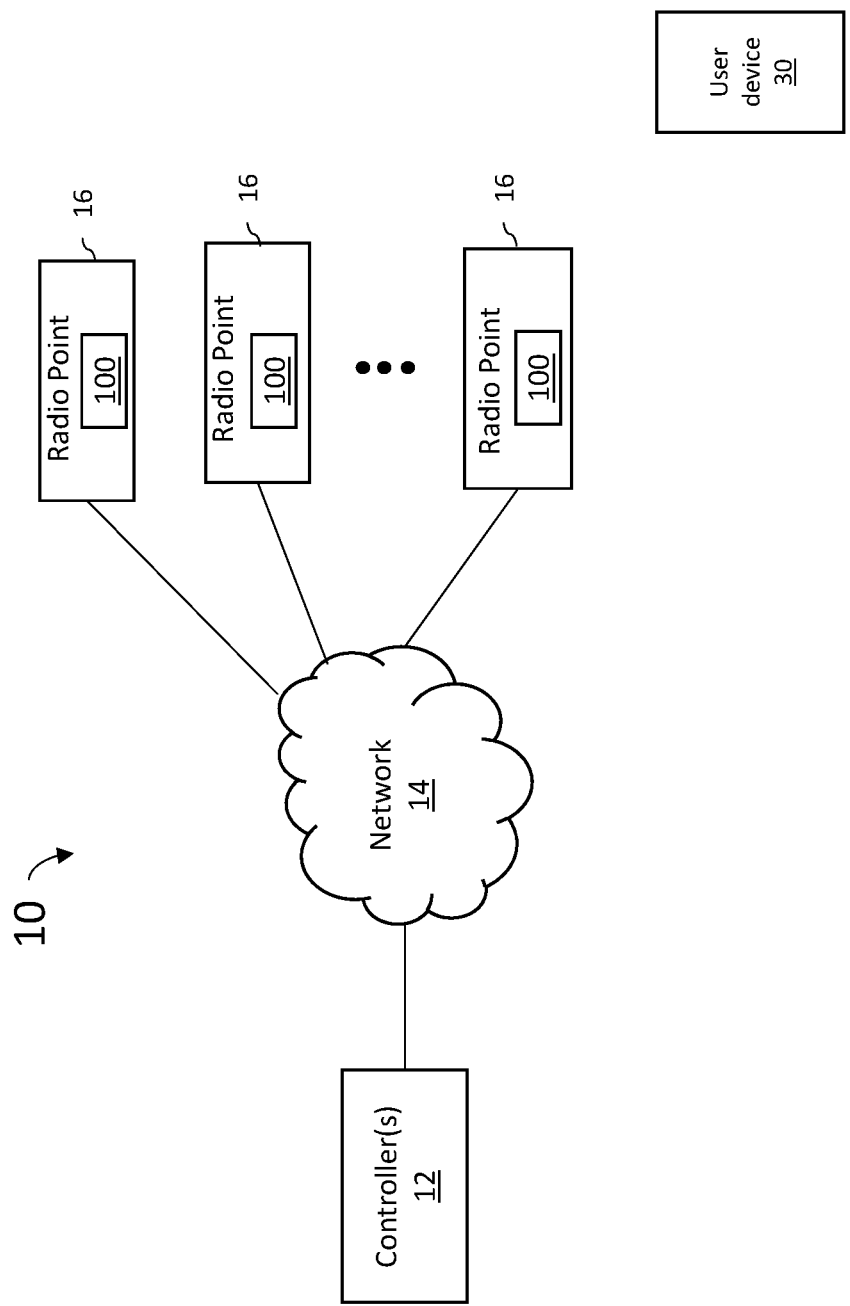
FIG. 1A is a block diagram that illustrates an example C-RAN implementation of an automatic level control system embodiment.

FIG. 1 is a diagram illustrating an example ALC system 100 for a communications system of one embodiment of the present disclosure. In alternate implementations the ALC system 100 may comprise a component of a wireless network access point (such as a wireless local area network access point), a cellular radio access network (RAN), carrier access point (CAP), a distributed antenna system (DAS) remote antenna unit (RAU), or a cellular base station or evolved Node B (for example, a radio point for a cloud or centralized RAN (C-RAN) architecture system). For example, FIG. 1A is a simplified block diagram that illustrates a C-RAN at 10 of one embodiment of the present disclosure. In this embodiment, one or more controllers 12 are coupled to a plurality of radio points 16 over a network 14 (for example, an Ethernet network). In one implementation of C-RAN 10, the network 14 is implemented over copper wiring and may further comprise one or more Ethernet switches coupled by the copper wiring. In other implementations, other transport media may be used such as but not limited to fiber optic cables. Alternate example architectures for C-RAN 10 are disclosed by U.S. patent application Ser. No. 13/762,283, filed on Feb. 7, 2013, and titled "RADIO ACCESS NETWORKS" (issued as U.S. Pat. No. 9,414,399) which is incorporated herein by reference in its entirety. In such embodiments, part of the baseband processing for the air interface is performed in the remote radio points 16 thus reducing the amount of data that is front-hauled between the controller 12 and the radio points 16. Downlink signals received by C-RAN 10 at controller 12 are transported by the radio points 16 to user devices 30. In the uplink direction, RF signals are collected from user devices 30 at each of the radio points 16 and transported to the controller 12. With embodiments of the present disclosure, one or more of the radio points 16 may comprise an ALC system 100 as illustrated in FIG. 1 and further described below. The embodiments described herein may facilitate shifting of baseband processing to remote radio points 16 by providing thermal and electromagnetic interference (EMI) management for high power density components that perform the processing.

Figure 1B:
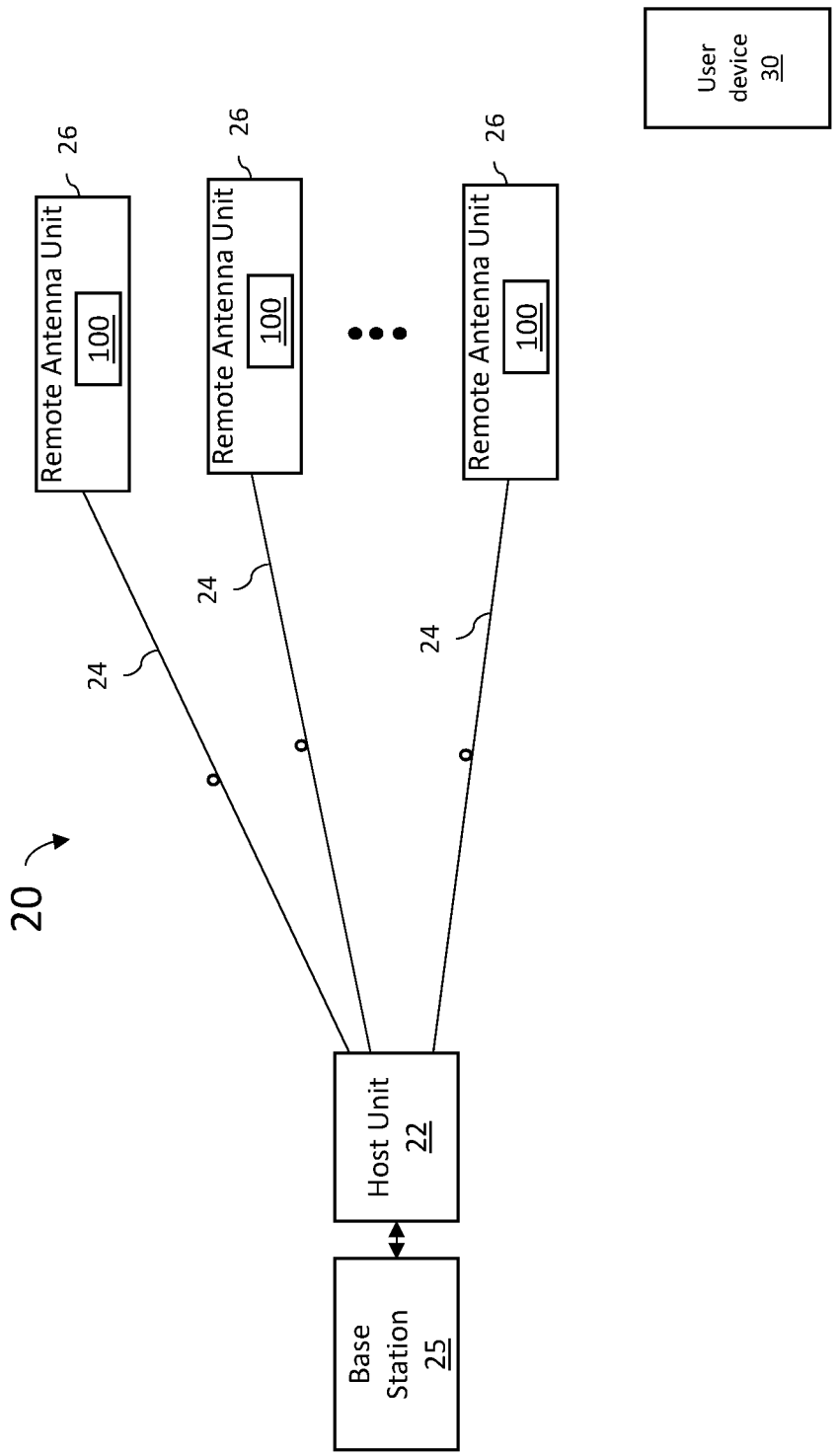
FIG. 1B is a block diagram that illustrates an example distributed antenna system implementation of an automatic level control system embodiment.

FIG. 1B is another block diagram that illustrates an example distributed antenna system at 20 of one embodiment of the present disclosure. DAS 20 comprises a host unit (or "head-end" unit) 22 coupled to a plurality of remote antenna units (shown at 26) by a plurality of digital transport links 24. Remote antenna units 26 may be directly coupled to a host unit 22 or indirectly coupled to host unit 22 via one or more intervening devices. Digital transport links 24 may comprise fiber optic links as shown in FIG. 1B, but in other implementation may comprise other materials such as but not limited to copper wires. In the downlink direction, DAS 20 operates as a point-to-multipoint transport for RF signals. Downlink signals received by DAS 20 at host unit 22 (for example, from a base station (BS) 25) are simultaneously transported to each of the remote antenna units 26 and then to user devices 30. In the uplink direction, RF signals are collected from user devices 30 at each of the remote antenna units 26 are transported to the host unit 22, where the RF signals are aggregated to provide a unified RF signal to further upstream components. Alternate example architectures for DAS 20 are disclosed by U.S. patent application Ser. No. 13/495,220, filed on Jun. 13, 2013, and titled "Distributed Antenna System Architectures" (issued as U.S. Pat. No. 9,748,906) which is incorporated herein by reference in its entirety. With embodiments of the present disclosure, one or more of the remote antenna units 26 may comprise an ALC system 100 as illustrated in FIG. 1 and further described below. The embodiments described herein may facilitate shifting of baseband processing to remote antenna units 26 by providing thermal and EMI management for high power density components that perform the processing.

As shown in FIG. 1, ALC system 100 comprises a Multi-Threshold Programmable ALC Controller 120 that receives one or more streams of RF signal I/Q samples from one or more uplink paths 110, each uplink path 110 carrying one or more bands of RF communication signals (indicated in FIG. 1 as Band A to Band (n)). Referring to Band A for the purpose of example, the uplink path 110 comprise a digital step attenuator (DSA) 114, an analog-to-digital converter (ADC) 116, and may comprise one or more amplifiers 115. In some embodiments, the uplink path 110 optionally further comprises a 1-bit step attenuator 112 that operates in conjunction with the digital step attenuator 114. The input received by the uplink path 110 comprises an analog domain RF signal transmitted, for example, by a mobile user device. The ADC 116 samples the analog domain RF signal to generate in-phase (I) and quadrature-phase (Q) complex samples of the analog domain RF signal. In some embodiments, the ADC 116 and/or other internal processing systems convert the RF input signals into 16 bit signed 2's complements I and Q signals. These complex I/Q samples provide the input to the Multi-Threshold Programmable ALC Controller 120 from which the Multi-Threshold Programmable ALC Controller 120 drives the DSA 114 (and optionally the 1-bit step attenuator 112) to attenuate high power RF signals that have the potential to overdrive the ADC 116.

In some embodiments, the ALC Controller 120 further comprises a common parallel data bus 128 which is used to communicate attenuation adjustment commands for each of the bands and uplink paths from the ALC Controller 120 to the various DSA 114. Access to the common parallel data bus 128 may be managed by a gate keeper 130 as further discussed below.

For each of the one or more Bands A-(n), the Multi-Threshold Programmable ALC Controller 120 comprises a corresponding IQ processor function 122, a programmable attenuation manager 123, and an ALC state machine 124, that evaluate the complex I/Q samples for that band to determine when the ALC adjustment should be performed. The I/Q samples are received by the IQ processor function 122, which generates an $I^2+Q^2$ sum square sample, referred to herein as a "peak sample", for each I/Q sample. In some embodiments, the IQ processor function 122 is used to convert 16 bit signed 2's complements I/Q signals into a 31 bits unsigned $I^2+Q^2$ signal. A Received Signal Strength Indicator (RSSI) measurement (which may be calculated as a function of $\Sigma[I^2+Q^2]$, for example) may also generated to provide data to the communication system regarding the RF input power levels for each receive path 110. In some embodiments, the RSSI measurement may further be utilized to calibrate clipping/headroom thresholds and/or the ALC State Machine 124. In some embodiments, the IQ processor function 122 may also calculate and output true root-mean-square (RMS) data sample calculated from the I/Q samples over a duration of time.

Figure 2:
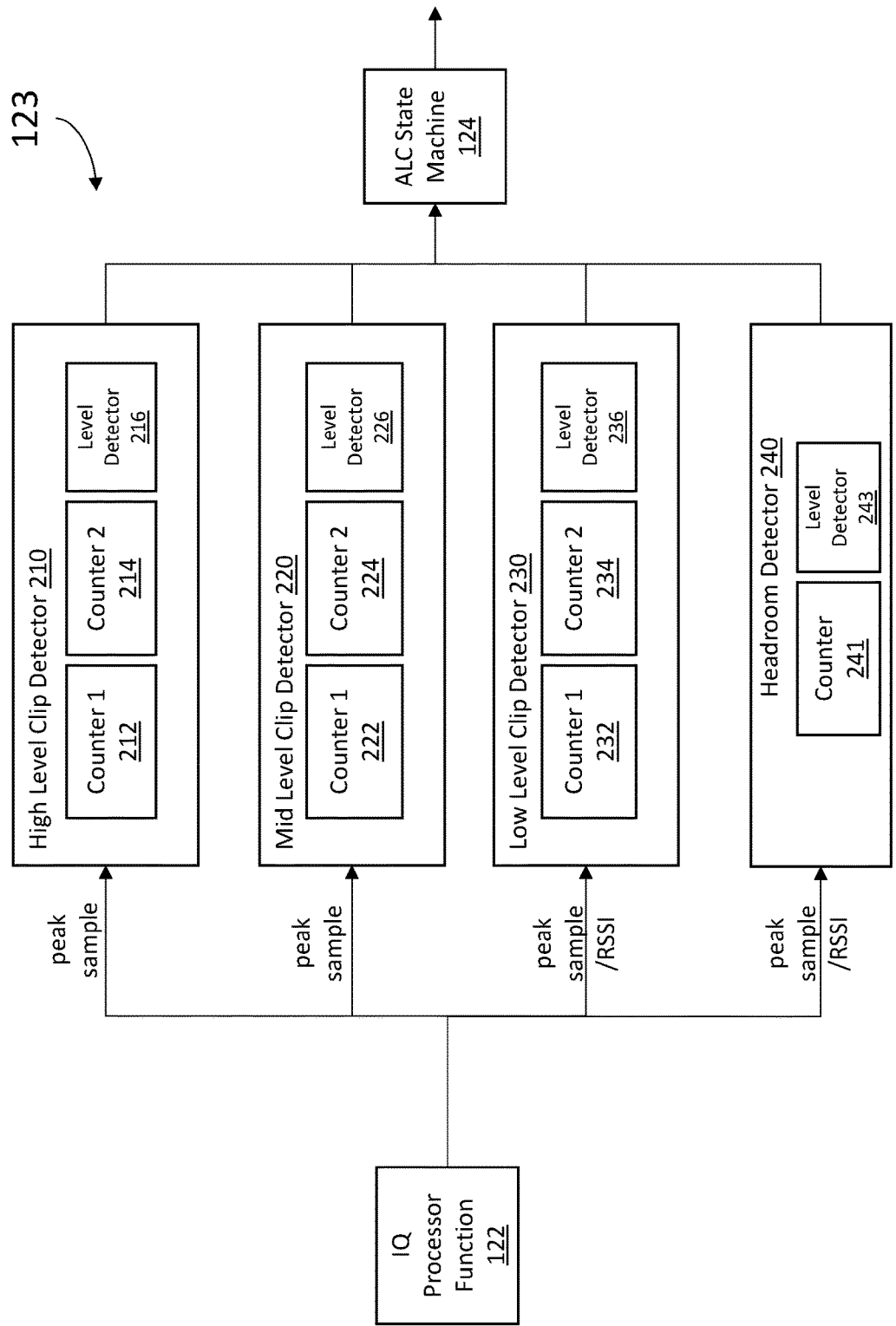
FIG. 2 is a block diagram illustrating an example programmable attenuation manager embodiment.

For the embodiments shown in FIG. 1, the peak samples generated by the IQ processor function 122 are input by the programmable attenuation manager 123 and provided to a plurality of clip detectors. In the particular embodiment shown in FIG. 2, the programmable attenuation manager 123 includes at least a high-level clip detector 210, a mid-level clip detector 220, a low-level clip detector 230, and a headroom detector 240, which are illustrated in FIG. 2. The clip detectors 210, 220 and 230 function in parallel to determine when an ALC adjustment to the DSA 114 is in order as a function of signal level and time as discussed below. In some embodiments, the programmable attenuation manager 123 may prioritize which ALC adjustment is implemented in the event that two or more of the clip detectors 210, 220 and 230 detect exceeded thresholds at the same time. For example, an ALC adjustment in response to a detection by the high-level clip detector 210 may take priority over a detection by the mid-level clip detector 220. Similarly, an ALC adjustment in response to a detection by the mid-level clip detector 220 may take priority over a detection by the low-level clip detector 230. The headroom detector 240 is used to evaluate if the RF input power is returned at low level value and there are the conditions to relax the external DSA attenuator and decrease its RF attenuator value. Although FIG. 2 illustrates a programmable attenuation manager 123 that comprises three distinct clip detectors, it should be understood that this intended only as a non-limiting illustrative example, in other embodiments, the programmable attenuation manager 123 may comprise any plurality of such clip detectors. In some embodiments, the RSSI data from the IQ processor function 122 may also be used as inputs to the low-level clip detector 230 and headroom detector 230 in place of the peak signals since these detectors are responsive to relatively lower signal power levels (which have less potential to degrade operation of the ADC 116) over longer time periods.

For the programmable attenuation manager 123, the processor 121 programs into each of the high-level clip detector 210, mid-level clip detector 220, and low-level clip detector 230, independent programmable thresholds each comprising an amplitude threshold and a time domain threshold. As discussed above, the CCDF of a modulated signal may be utilized to determine how much time a signal spends at or above a given power level. The power level may be expressed in dB relative to the average power. The time domain threshold by be express either in terms of seconds, or in terms of number of samples.

Figure 2A:
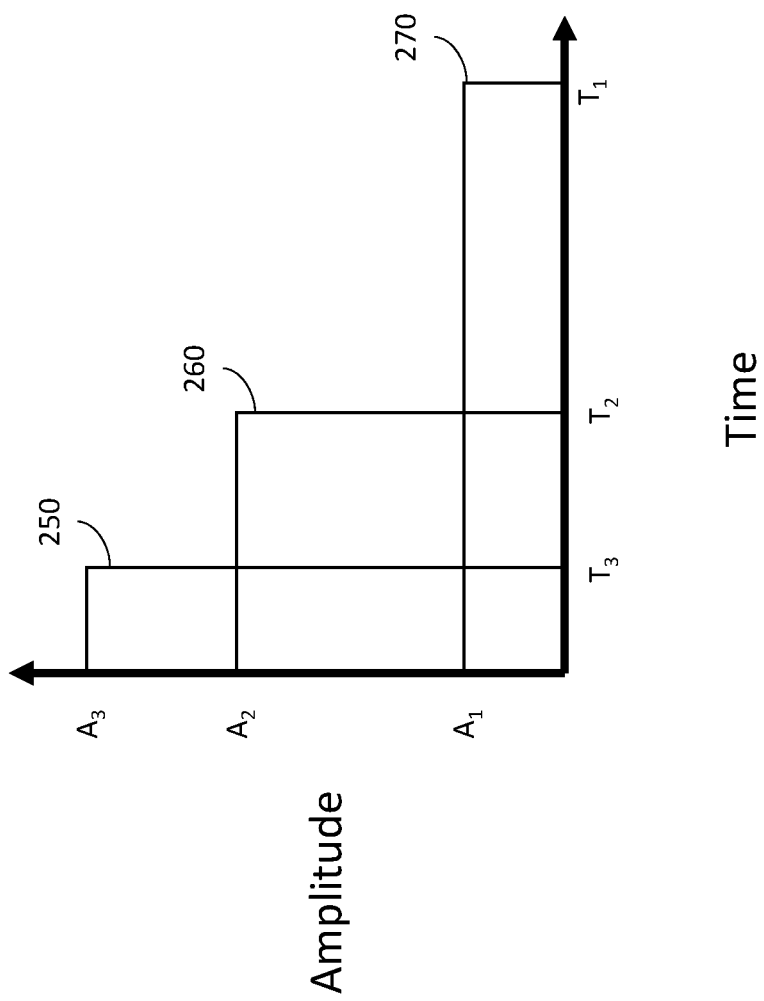
FIG. 2A is a figure illustrating multiple amplitude and time thresholds for an example programmable attenuation manager embodiment.

In other words, each of clip detectors 210, 220 and 230 will determine the duration of time that their input (whether that input comprises a peak sample or an RSSI value) is at or above the threshold value they are programmed to monitor. In some embodiments, they may compute the percentage of time that the signal spends at or above the specified power level. FIG. 2A is a diagram illustrating the three distinct thresholds 250, 260 and 270 monitored by clip detectors 210, 220 and 230 respectively. In this example, the low-level clip detector 230 is programmed to monitor its input from the IQ processor function 122 to determine when that signal has reached or exceeded an amplitude of $A_1$ for at least a time of $T_1$. When that occurs, the low-level clip detector 230 will generate a signal to the ALC state machine 124 to drive the DSA 114 to attenuate the incoming RF signal in that path 110. The mid-level clip detector 220 is programmed to monitor its input from the IQ processor function 122 to determine when that signal has reached or exceeded an amplitude of $A_2$ for at least a time of $T_2$ (where $A_2 > A_1$ and $T_1 > T_2$). When that occurs, the mid-level clip detector 220 will generate a signal to the ALC state machine 124 to drive the DSA 114 to attenuate the incoming RF signal in that path 110. In this case, the amplitude threshold A2 for the mid-level clip detector 220 is greater than the amplitude threshold A1 for the low-level clip detector 230, while the time threshold $T_2$ for the mid-level clip detector 220 is less than the time threshold $T_1$ for the low-level clip detector 230. As a result, shorter duration RF power increases that exceed $A_1$ and $A_2$, that do not exist for a time of at least $T_1$ but do exists for a time of at least $T_2$, can be corrected by the mid-level clip detector 220.

Similarly, the high-level clip detector 220 is programmed to monitor its input from the IQ processor function 122 to determine when that signal has reached or exceeded an amplitude of $A_3$ for at least a time of $T_3$ (where $A_3 > A_2 > A_1$, and $T_1 > T_2 > T_3$). When that occurs, the high-level clip detector 210 will generate a signal to the ALC state machine 124 to drive the DSA 114 to attenuate the incoming RF signal in that path 110. In this case, the amplitude threshold $A_3$ for the high-level clip detector 210 is greater than the amplitude thresholds $A_1$ and $A_2$ for the mid and low-level clip detector 220, 230, while the time threshold $T_3$ for the high-level clip detector 210 is less than the time thresholds $T_1$, $T_2$ for the low and mid-level clip detectors 220, 230. As a result, much shorter duration RF power increases that exceed $A_1$, $A_2$ and $A_3$, that do not exist for a time of at least $T_1$ or $T_2$, but do exists for a time of at least $T_3$, can be corrected by the high-level clip detector 210.

Moreover, each clip detector 210, 220, 230 can be instantiated to determine when their respective time thresholds have been exceeded in different manners. For example, for the example embodiment of the programmable attenuation manager 123 shown in FIG. 2, the high-level clip detector 210 comprises a first counter 212 ("Counter 1") a second counter 214 ("Counter 2") and a level detector 216. The mid-level clip detector 220 comprises a first counter 222 ("Counter 1") a second counter 224 ("Counter 2") and a level detector 226. The low-level clip detector 230 comprises a first counter 232 ("Counter 1") a second counter 234 ("Counter 2") and a level detector 236.

Figure 3A:
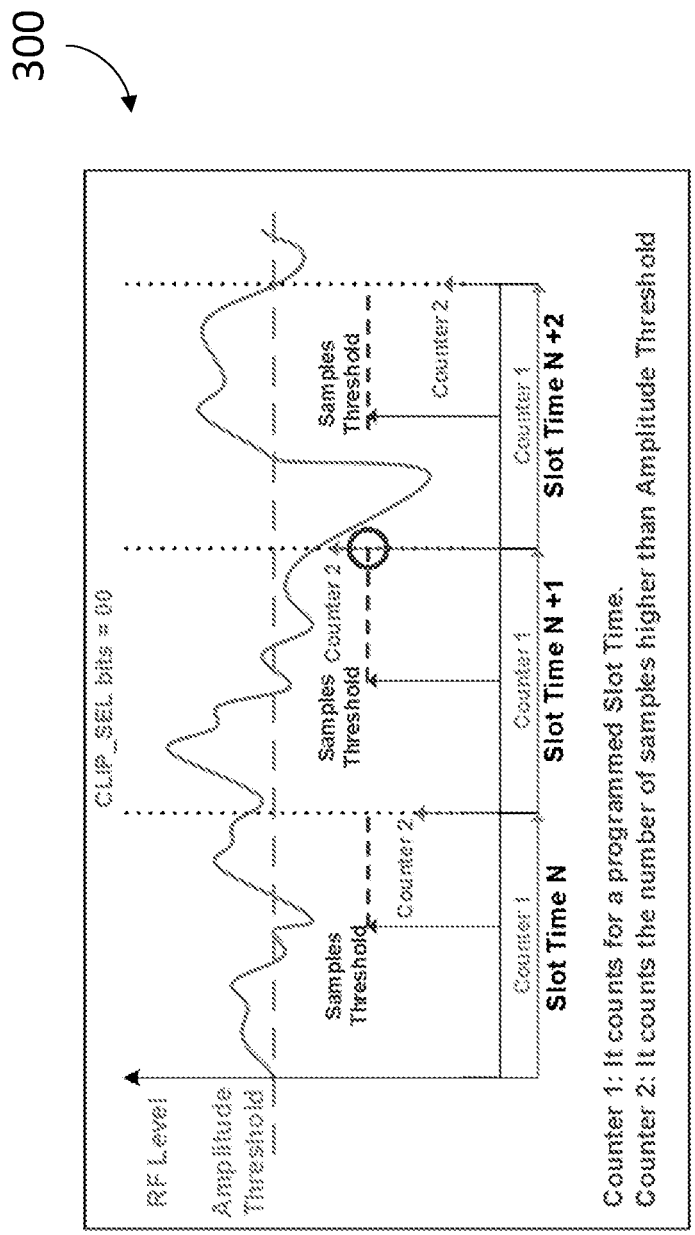
FIGS. 3A, 3B and 3C are plots illustrating operation of an example programmable attenuation manager embodiments.

In one mode of operation, illustrated by the graph 300 in FIG. 3A, both the Counter 1 and Counter 2 threshold counters are used. Counter 1 is used to count the duration of the slot time during which the input signal from the IQ processor function 122 is checked, while Counter 2 counts how many input samples have been received over the duration of the slot time that exceed the amplitude threshold for that detector. Each input sample that exceeds the amplitude threshold (as determined, for example, by the Level Detector) is counted by Counter 2. It is not necessary for such samples exceeding the amplitude threshold to be consecutive to be counted by Counter 2. If the number of samples counted by Counter 2 (during the slot time measured by Counter 1) does not exceed the number associated with the time threshold for that detector, then that detector does not signal the ALC state machine 124 to initiate an ALC adjustment to increase attenuation. In contrast, if the number of samples counted by Counter 2 (during the slot time measured by Counter 1) does exceed the number associated with the time threshold for that detector, then that detector does signal the ALC state machine 124 to initiate an ALC adjustment. This mode which checks how many samples are over the threshold within a specific Slot Time, may be referred to as a "Pseudo RMS" detection.

Figure 3B:
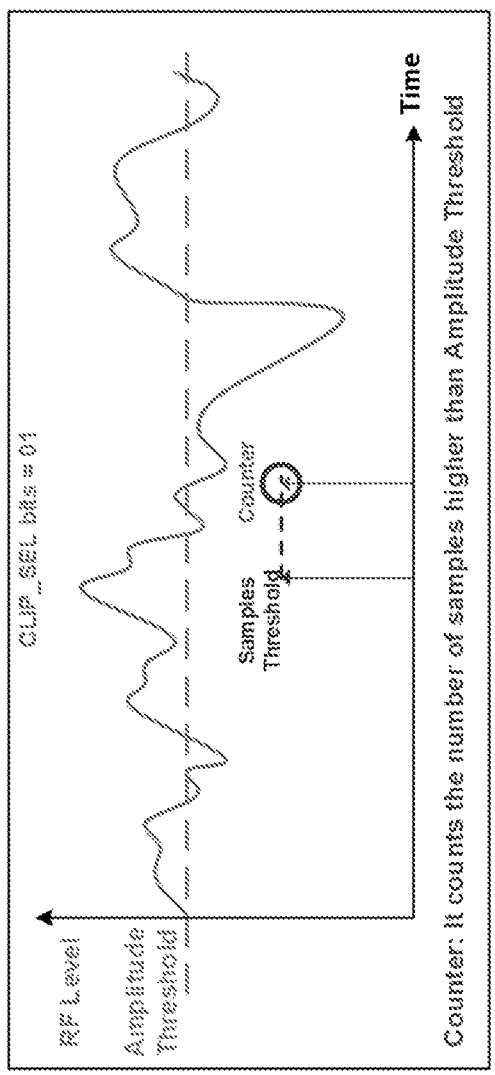

In a second mode of operation, illustrated by the graph in FIG. 3B, only the threshold counter (Counter 2) needs to be utilized. In this mode, Counter 2 counts the samples that exceed the amplitude threshold (as determined by the respective level detector) and generates a signal to the ALC state machine 124 to initiate an ALC adjustment to increase attenuation when a number of samples corresponding to the time threshold have been counted.

Figure 3C:
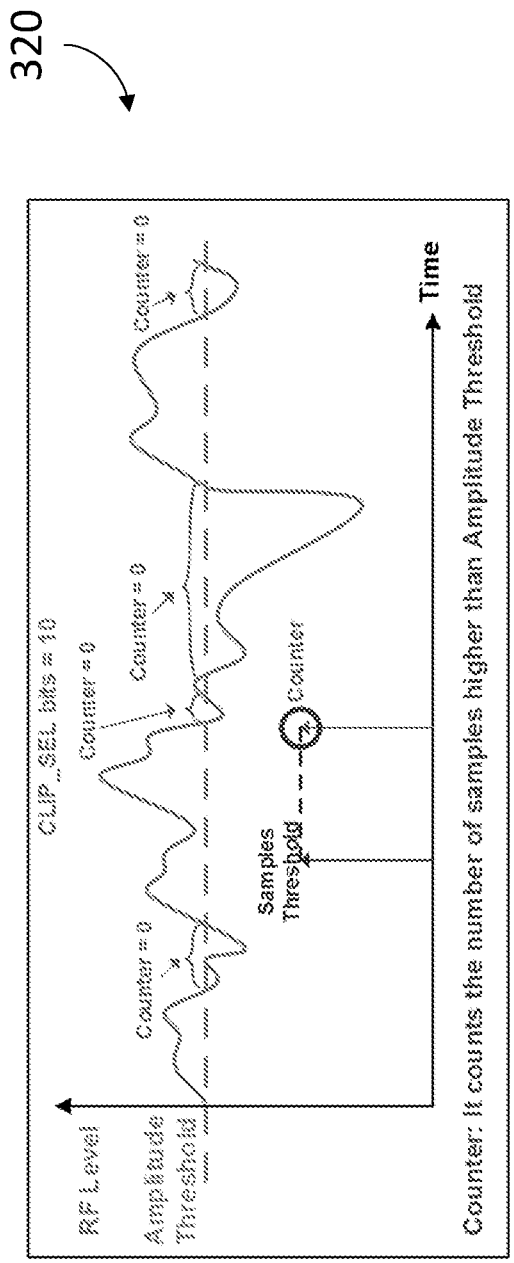

In a third mode of operation, illustrated by the graph in FIG. 3C, again, only the threshold counter (Counter 2) needs to be utilized. The Counter 2 operates in the same manner as in the second mode, except that Counter 2 resets to zero whenever the level detector measures a sample having a level below the amplitude threshold. As such, the Counter 2 in this mode must count a number of consecutive samples exceeding the threshold corresponding to the time threshold, before that detector will generate a signal to the ALC state machine 124 to initiate an ALC adjustment to increase attenuation.

Any one of the detectors 210, 220 and 230 may function in any of the modes described above, and it should be noted that it is not necessary for any one of the detectors to operate in the mode as any other detector. Also, as noted above, for the low-level clip detector 230, the counters and level detector may operate using either a peak sample input or RSSI value input from the IQ processor function 122 since the time threshold for this detector provides ample time for performing RSSI calculations. Also as noted above, to accommodate TDD operation, the processor 121 may communicate to the programmable attenuation manager 123 for each band when that band switches between uplink and downlink operation. In some embodiments, operation of the clip detectors 210, 220, 230 is paused during downlink operation, and resumes when uplink operation resumes. In some embodiments, during downlink operation, Counter 1 and Counter 2 are reset and the ALC step applied to the DSA 114 is maintained at the level determined during the last uplink period of operation.

Also as illustrated in FIG. 2, in some embodiments, the headroom detector 240 may comprise at least one threshold counter 241 and a level detector 243. The input to the headroom selector 240 may comprise either of the peak sample or RSSI measurement sample produced by the IQ processor function 122. In one embodiment, if the level detector 243 detects at least one sample that exceeds the headroom amplitude threshold value, the threshold counter is reset to zero. When the counter is able to reach the headroom time threshold value without detection of a sample exceeding the headroom amplitude threshold value, a headroom adjustment signal may be communicated to the ALC state machine 124 to initiate an ALC adjustment to decrease attenuation. It should be noted that the headroom amplitude threshold is programed to be lower than the lowest amplitude threshold of any of the clip detectors.

Figure 4:
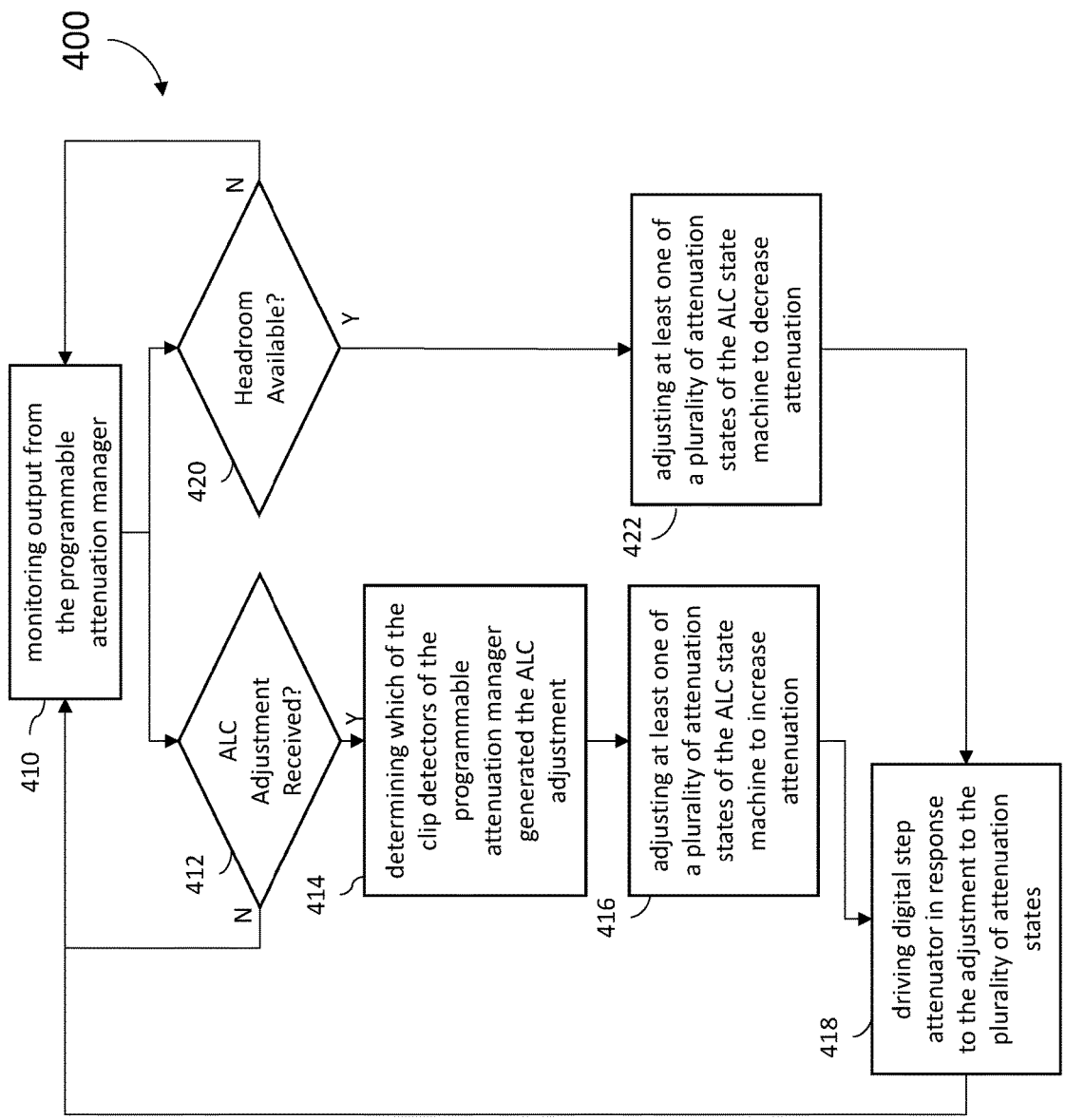
FIG. 4 is a flow chart illustrating an example attenuation level control state machine.

The ALC state machine 124 functions to drive the DSA 114 (and optionally the 1-bit Step Attenuator 112) to further attenuate the incoming RF signal in response to the signals received from the programmable attenuation manager 123. Moreover, ALC state machine 124 may drive the DSA 114 differently (e.g. a different number of steps) as a function of which of the plurality of clip detectors 210, 220, 230 within the programmable attenuation manager 123 initiates the ALC intervention. For example, FIG. 4 is a flow chart illustrating an example method 400 for one embodiment that describes operation of the ALC state machine 124 in response to signals from the programmable attenuation manager 123. The ALC state machine 124 is configured to have a settable number of states, which may be dependent on the size of a single step and dB attenuation range supported by the DSA 114. The method 400 begins at 410, where the ALC state machine 124 is operating at steady state conditions and is monitoring the output from the programmable attenuation manager 123. This output may indicate when one of the clip detectors 210, 220, 230 had detected an exceeded clip threshold, and inversely may indicate when headroom is available. It should be understood that adjusting ALC in response to a detection of an exceeded clip threshold would take precedent over adjusting ALC in response to an indication that headroom is available. When an ALC adjustment signal is received (checked at 412), the process proceeds to 414 with determining which of the clip detectors of the programmable attenuation manager 123 generated the ALC adjustment signal. The method then proceeds to 416 with adjusting at least one of a plurality of attenuation states of the ALC state machine 124 based on which of the clip detectors of the programmable attenuation manager 123 generated the ALC adjustment signal. For example, in one embodiment, when the high-level clip detector 210 has generated the ALC adjustment signal, the method at 416 adjusts a high-level attenuation state of the ALC state machine 124. When the mid-level clip detector 220 has generated the ALC adjustment signal, the method at 416 adjusts a mid-level attenuation state of the ALC state machine 124. When the low-level clip detector 230 has generated the ALC adjustment signal, the method at 416 adjusts a low-level attenuation state of the ALC state machine 124. In some embodiments, a low-level attenuation step may be fixed at a minimum available step, while high and medium attenuation steps may be programmable such as a specifiable multiple of the minimum available step. For example, a low-level attenuation step may provide for an attenuation step of 0.5 dB (which may correspond to a minimum available step) while the high and medium attenuation steps are each some respective integer multiple of 0.5 dB. Each of the plurality of attenuation states may be used to drive the digital step attenuator 114 using a different number of attenuation steps. For example, an incremental change in the low-level attenuation state may drive the digital step attenuator 114 to increase attenuation by x1 number of steps. An incremental change in the mid-level attenuation state may drive the digital step attenuator 114 to increase attenuation by x2 number of steps. An incremental change in the high-level attenuation state may drive the digital step attenuator 114 to increase attenuation by x3 number of steps. In some embodiments, the steps may be such that x2>x1 and/or x3>x2, but that need not be the case. Accordingly, the method next proceeds to 418 with driving the digital step attenuator 114 in response to the adjustment to the plurality of attenuation states. The method may then return to 410 with monitoring for signals from the programmable attenuation manager 123.

As discussed above, the programmable attenuation manager 123 also comprises a headroom detector 240 which also inputs and process peak samples and/or RSSI measurement to determine when the RF input power received at an uplink path 110 has returned to a sufficiently low level (e.g., below a defined threshold value) such that the ALC system 100 may relax the ALC and drive the DSA 114 to decrease the level of attenuation it is applying to the incoming RF signal. Accordingly, when the method 400 may proceed from 410 to 420 with detecting when headroom is available based on a signal received from the programmable attenuation manager 123. In one embodiment, when the ALC state machine 124 detects that there is enough headroom available to decrease attenuation, the method proceeds to 422 with adjusting at least one of the plurality of attenuation states of the ALC state machine 124 to decrease attenuation, and back to 418 with driving the digital step attenuator 114 in response to the adjustment to the plurality of attenuation states. In some embodiments, a headroom initiated attenuation step may be fixed, for example at a minimum available step (such as 0.5 db, for example). In some embodiments, a headroom initiated attenuation step may instead be programmable, such as a specifiable multiple of the minimum available step. In some embodiments, adjustments made to decrease attenuation may correspond in magnitude to the number of steps associated with the increases by the low-level attenuation state. In some embodiments, the ALC state machine 124 may further implement adjustments to the digital step attenuator to provide for automatic setting of temperature compensation and/or Analogic Gain Adjust using a specific register for each band.

As mentioned above, in some embodiments, the ALC Controller 120 comprises the common parallel data bus 128 which is used to communicate attenuation adjustment commands for each of the bands and uplink paths from the ALC Controller 120 to the various DSA 114.

Because the bus 128 is a shared resource, the gate keeper 130 operates to prevent multiple ALC state machines 124 from attempting to simultaneously use this shared bus 128. Moreover, it may function to prevent one band from monopolizing use of the bus 128 to the point where other bands may not reliably communicate ALC adjustments with their respective DSA 114 when needed. In some embodiments, access to the common parallel data bus 128 is managed by the gate keeper 130 (which may operate as a pseudo-Round Robin Arbiter) to implement a variable priority as to which ALC state machine 124 has priority to use the bus 128 to communicate ALC adjustments from their associated DSA 114. For example, in some embodiments, each ALC state machine 124 associated with an uplink path 110 is in communication with the gate keeper 130. When the ALC state machine 124 needs to communicate a change in attenuation state to its associated DSA 114 (such as after performing blocks 416 or 422 of method 400), it requests access to the bus 128 from the gate keeper 130. If the request is granted, then the ALC state machine 124, with the gate keeper 130, will proceed to communicate with its DSA 114 drive attenuation as needed (such as performed at block 418 of method 400). If the request is not granted, the ALC state machine 124 will withhold from communicate with its DSA 114 until such request is granted.

Figure 5A:
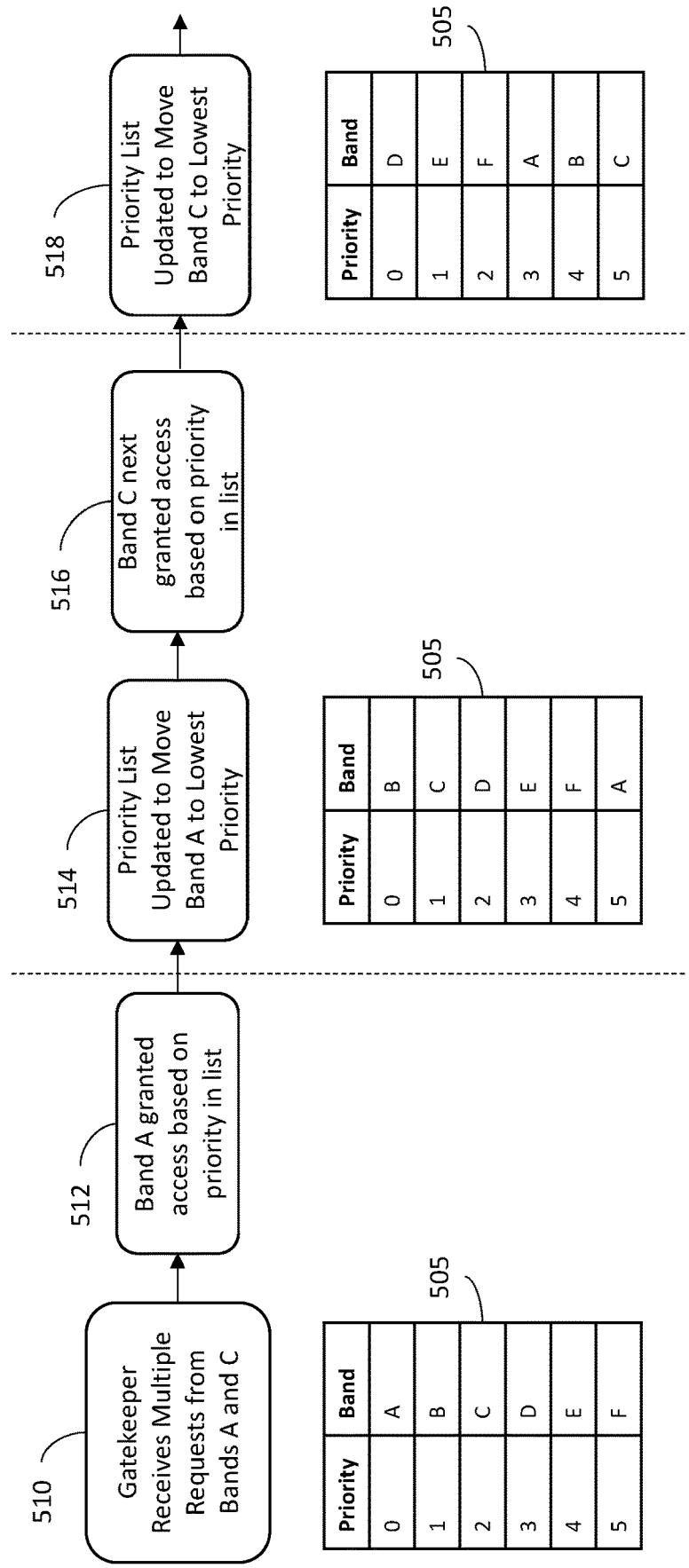
FIGS. 5A and 5B are flow diagrams illustration a bus gate keeper for an example automatic level control system embodiment.
Figure 5B:
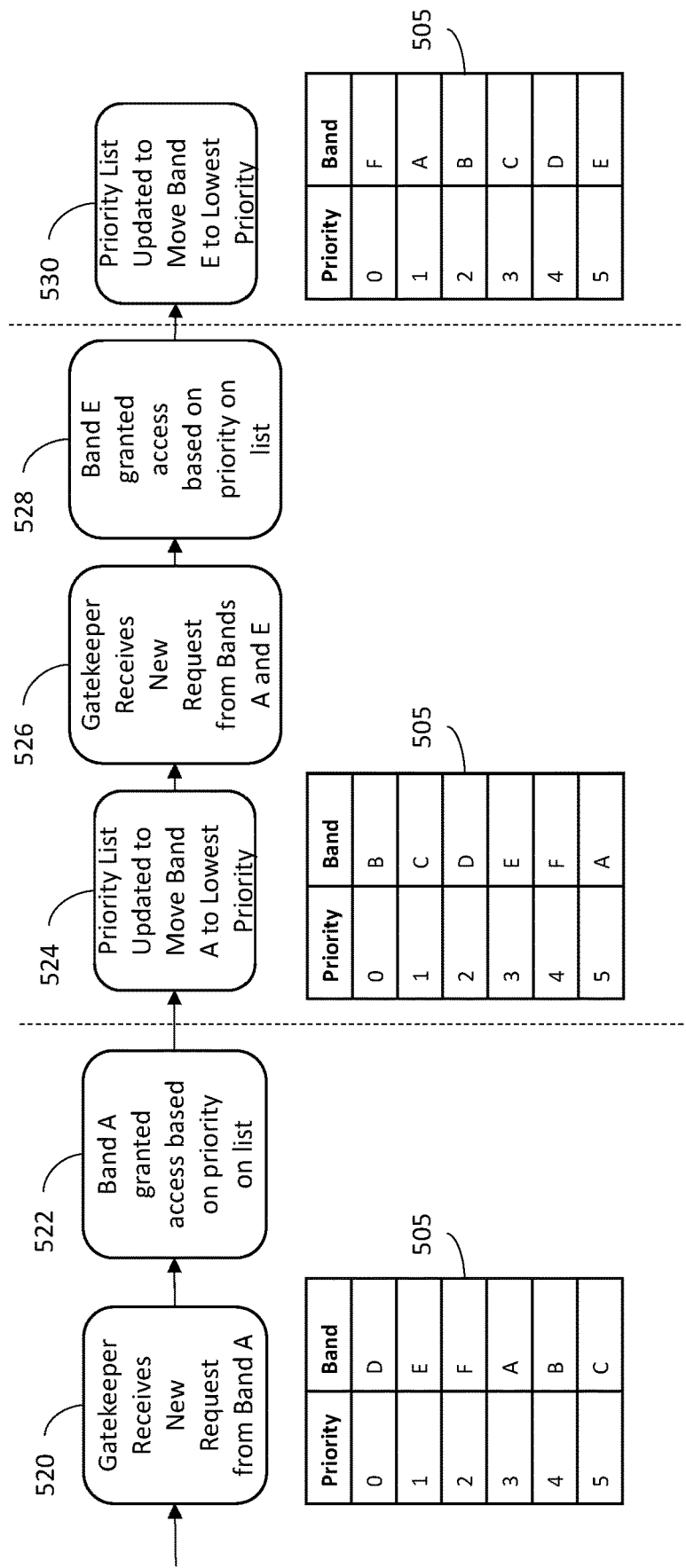

In some embodiments, when two or more of the ALC state machines 124 are requesting access to the bus 128 at the same time, the gate keeper 130 will refer to a dynamically changing priority list to determine which ALC state machine 124 will next be granted access to the bus 128. The priority list is dynamically updated to prevent one band that may need very frequent ALC adjustments, from monopolizing access to the bus 128. That is, if one band needs frequent ALC adjustments (for example, because it is experiencing problems caused by noise), that band may need ALC adjustments more frequently than other bands, and therefore its ALC state machine 124 will need access to the bus 128 more frequently, which in turn reduces the amount of time available for other ALC state machine 124 to access the bus 128. As such, as the ALC state machine's 124 compete for access to the bus 128, the band needing very frequent ALC adjustments may effectively block or impair the other ALC state machine's 124 from implementing timely ALC adjustments for their bands. As such, the priority list is maintained by the gate keeper 130 such that the ALC state machine 124 which has implemented the most recent ALC adjustment is assigned to the lowest priority position on the priority list. It will remain at the lowest priority position until such time as another ALC state machine 124 is granted access to the bus 128, at which time that other ALC state machine 124, now having made the most recent ALC adjustment, would then be assigned the lowest position of the priority list. FIGS. 5A and 5B provide a flowchart illustrating one example of the process for dynamic update of a priority list 505 by the gate keeper 130. At the starting condition, a priority list 505 is shown as prioritizing 6 bands (shown as bands A, B, C, D, E, and F) each ranked in a priority from 0 (defining the highest priority) to 5 (defining the lowest priority). At the startup of the ALC system 100, the priority list 505 may be initialized with the bands A, B, C, D, E, and F. In this example, they are initially prioritized in alphabetical order for the purpose of ease of discussion. Starting at 510 in FIG. 5A, the gate keeper 130 receives bus 128 access requests from the ALC state machines of both band A and band C. Because the gate keeper 130 has received multiple access requests, it refers to the priority lists 505 which indicates that band A has a priority of "0", which is a higher priority that the priority of band C, which has a priority of "2". Accordingly, at 512 the gate keeper 130 grants access to the bus 128 to the ALC state machine 124 for band A. The gate keeper 130 then updates the priority lists 505 as shown at 514 to reassign band A to a priority of "5" (the lowest priority on the list). The priorities of the remaining bands are circularly shifted accordingly (that is, wrapping around the priority table while maintaining the same fixed relative A to F order as shown in FIGS. 5A and 5B). This circular shifting provides that each RF Bands can implement at least one DSA adjustment every 6 requests for a priority list that has 5 bands (or every "n"+1 requests for a priority list 505 that priorities "n" bands). At 516, the gate keeper 130, which had previously queued the request received from Band C, now grants access to the bus 128 to the ALC state machine 124 for band C. The gate keeper 130 then updates the priority lists 505 as shown at 518 to reassign band C to a priority of "5" (the lowest priority on the list). The priorities of the remaining bands circularly shifted in the list. Proceeding to FIG. 5B, the gate keeper at 520 received a new access request from the ALC state machine of band A. Although band A is at a low priority level near the bottom of the priority list 505, because no other ALC state machines have requests access, the gate keeper at 522 proceeds to grant access to the bus 128 to the ALC state machine 124 for band A. The gate keeper 130 then updates the priority lists 505 as shown at 524 to reassign band A to a priority of "5" (the lowest priority on the list). The priorities of the remaining bands are again circularly shifted. Proceeding to 526 in FIG.

5B, the gate keeper 130 next receives bus 128 access requests from the ALC state machines of both band A and band E. Because the gate keeper 130 has received multiple access requests, it refers to the priority lists 505 which indicates that band E currently has a priority of "3", which is a higher priority that the priority of band A, which currently has a priority of "5". Accordingly, at 528 the gate keeper 130 grants access to the bus 128 to the ALC state machine 124 for band E. The gate keeper 130 then updates the priority lists 505 as shown at 530 to reassign band E to a priority of "5" (the lowest priority on the list). As such, although Band A in this example requires ALC adjustments significantly more frequently than the other bands B-F, its frequent access of the bus 128 does not delay or inhibit the ability of the other bands B-F from accessing the bus to implement ALC adjustments as needed.

Figure 6:
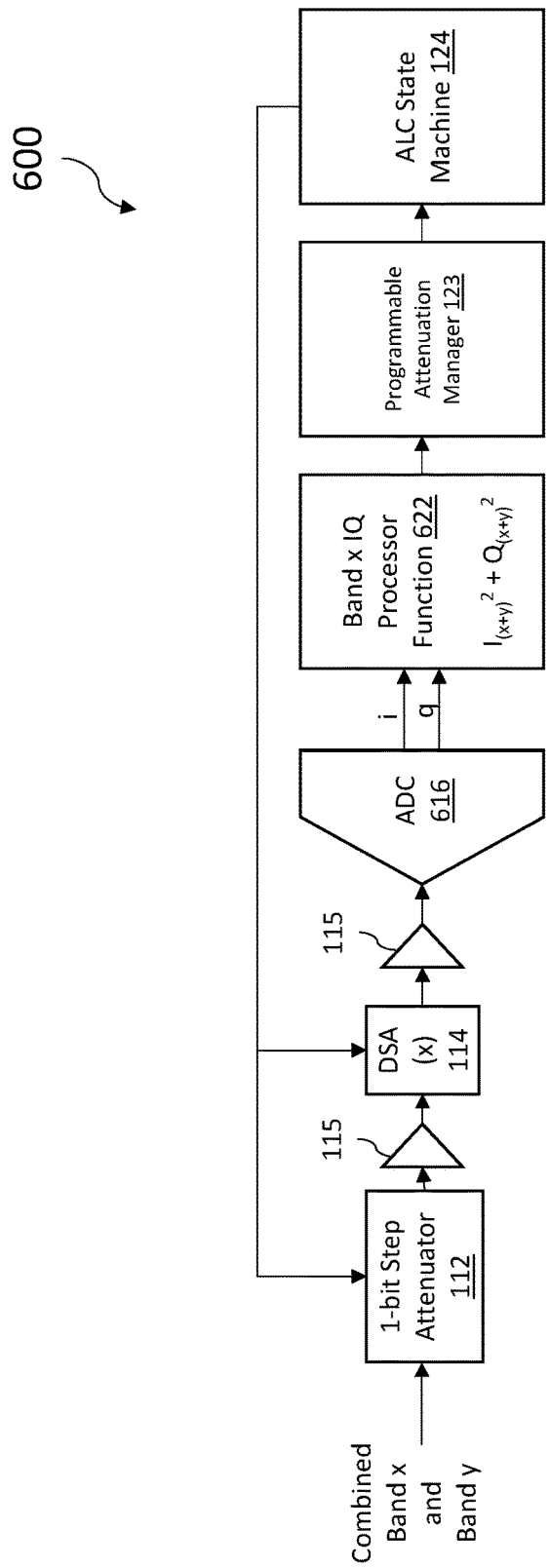
FIGS. 6 and 7 are diagrams showing alternate combined band signal path configurations for an example automatic level control system embodiment.

It should be understood that in some embodiments, one or more of the uplink paths 110 may actually carry communications for multiple communications bands (which otherwise may be referred to as "Combined Bands"). For example, in the embodiment shown in FIG. 6, an uplink path 600 (which may take the place of any of the uplink paths 110 shown in FIG. 1) may instead comprise a single ADC 616 to process multiple bands (e.g., band x and band y) that fall within the bandwidth processed by that uplink path 110. Here, IQ Processor Function 622 for uplink path 600 is configured to compute peak samples for input by the programmable attenuation manager 123 as a function of squaring the sum of the in-phase (I) x and y samples, squaring the sum of the quadrature-phase (Q) x and y samples, and adding the squared sums together, which may be expressed as $I_{(x+y)}^2 + Q_{(x+y)}^2$. The resulting peak sample values for the combined bands may then be used as input to the programmable attenuation manager 123 so that the ALC state machine 124 can drive the DSA 114 (and optionally 1-bit step attenuator 112) for in the manner described above. In some embodiments, the IQ Processor Function 622 may still calculate RSSI values and/or $I^2+Q^2$ values for the distinct x and y bands from the received RF signal I/Q samples, for input to the processor 121, programmable attenuation manager 123 or for other reasons.

Figure 7:
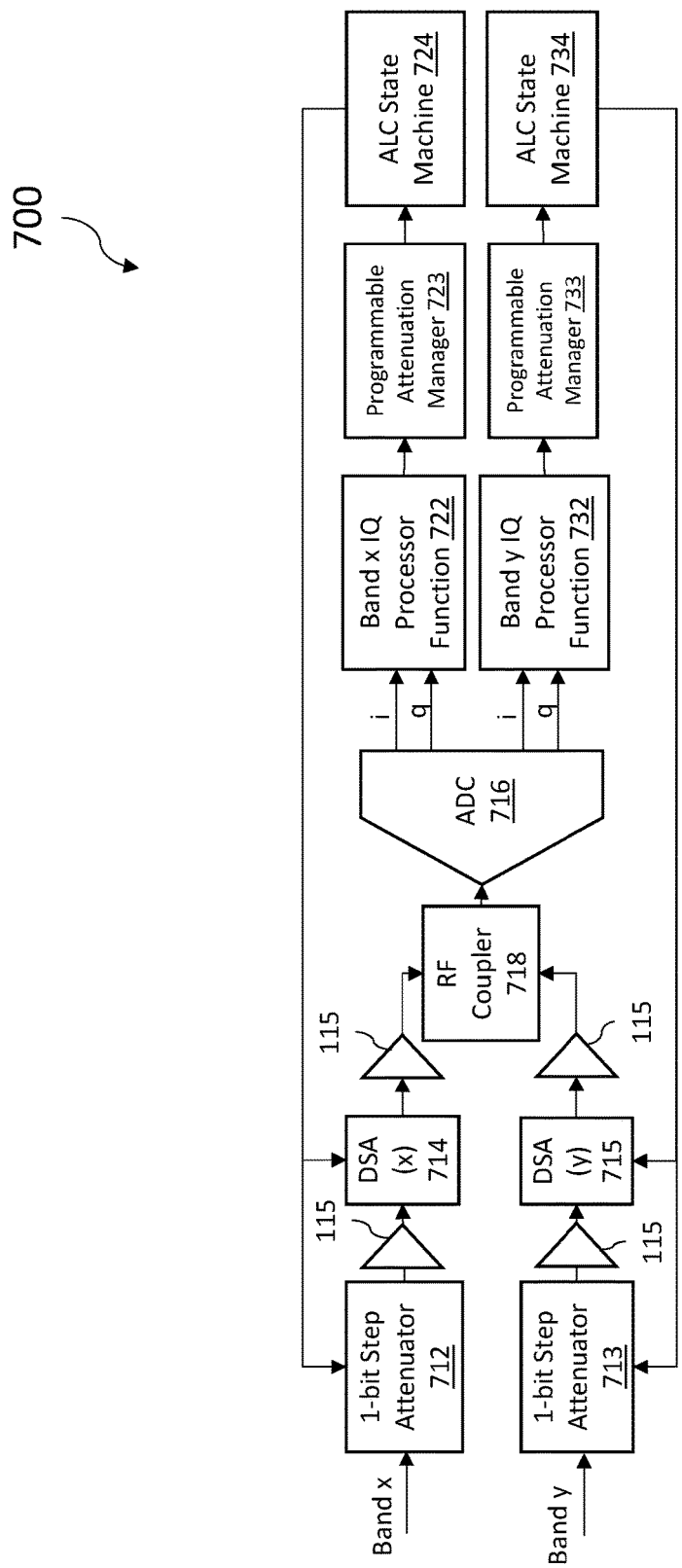

In other embodiment used for processing combined bands, such as shown in FIG. 7, one or more of the uplink paths 110 may comprise a single ADC 716 to process multiple bands (e.g., band x and band y) but have specific ALC components dedicated to each of the the multiple bands. In FIG. 7, an example uplink path 700 (which may take the place of any of the uplink paths 110 shown in FIG. 1) comprises a single ADC 716 that receives the analog signals for Band x and y. The RF signal for Band x is received through a path that comprises a DSA 714 and may optionally comprise a 1-bit Step Attenuator 712. The RF signal for Band y is received through a path that comprises a DSA 715 and may optionally comprise a 1-bit Step Attenuator 713. In some embodiments, the analog RF signals for band x and bandy may be combined by an RF coupler 718 prior to input into the ADC 716. The digitized I/Q complex sample output from the ADC 716 is received by IQ Processor Function 722 and also by IQ Processor Function 732. In some embodiments, the ADC 716 or processing system digitally filters the I/Q samples so that it only further processes those samples related to the Band x RF signals. The IQ Processor Function 722 functions in the same manner described above for IQ processor function 122, to calculate $I^2+Q^2$ peak sample values, and RSSI measurements, from the Band x I/Q samples. Those values are received by the programmable attenuation manager 723 to drive operation of an ALC state machine 724, each of which function in the same manner as described above for programmable attenuation manager 123 and ALC state machine 124, respectively. As states of the ALC state machine 724 are adjusted by the programmable attenuation manager 723, the ALC state machine 724 drives the attenuation steps applied by the DSA 714 (and optionally 1-bit step attenuator 712) to control the attenuation of the RF signal being received by the ADC 716 for Band x.

For the RF signals of Band y, the ADC 716 or processing system may be configured to digitally filter the I/Q samples received from the ADC 716, so that it only further processes those samples related to the Band y RF signals. The IQ Processor Function 732 functions in the same manner described above for IQ processor function 122, to calculate $I^2+Q^2$ peak sample values, and RSSI measurements, from the Band y I/Q samples. Those values are received by the programmable attenuation manager 733 to drive operation of an ALC state machine 734, each of which function in the same manner as described above for programmable attenuation manager 123 and ALC state machine 124, respectively. As states of the ALC state machine 734 are adjusted by the programmable attenuation manager 733, the ALC state machine 734 drives the attenuation steps applied by the DSA 715 (and optionally 1-bit step attenuator 713) to control the attenuation of the RF signal being received by the ADC 716 for Band y.

In some combined band embodiments, the operation of the IQ Processor Functions 123 may be reconfigurable by the processor 121 to switch operation between that shown by IQ Processor Function 622 (which calculates $I_{(x+y)}^2 + Q_{(x+y)}^2$ peak samples for the combination of bands), and by IQ Processor Functions 722, 732 (which each calculate $I^2+Q^2$ peak samples for their specific bands x or y).

EXAMPLE EMBODIMENTS

Example 1 includes an automatic level control (ALC) system for communications signals, the system comprising: a multi-threshold programmable ALC controller; and at least one signal path that includes: a digital step attenuator configured to receive an analog communications signal and attenuate the communications signal in response to an attenuation adjustment signal from the multi-threshold programmable ALC controller; and an analog-to-digital converter configured to receive the communications signal as attenuated by the digital step attenuator, wherein the multi-threshold programmable ALC controller receives complex IQ samples of the attenuated communication signal; wherein the multi-threshold programmable ALC controller comprises a plurality of clip detectors that function in parallel, wherein each of the plurality of clip detectors are programmed with a respective amplitude and time threshold, wherein based on which of the plurality of clip detectors determine that the complex IQ samples exceed their respective amplitude and time threshold, the multi-threshold programmable ALC controller generates the attenuation adjustment signal to the digital step attenuator.

Example 2 includes the system of example 1, the at least one signal path further comprising a 1-bit step attenuator in series with the digital step attenuator prior to the analog-to-digital converter, wherein the 1-bit step attenuator is configured to attenuate the communications signal in response to the attenuation adjustment signal from the multi-threshold programmable ALC controller.

Example 3 includes the system of any of examples 1-2, wherein the multi-threshold programmable ALC controller comprises: a processor; and a programmable attenuation manager that includes the plurality of clip detectors, wherein the programmable attenuation manager configures the respective amplitude and time threshold for each of the plurality of clip detectors based on input from the processor.

Example 4 includes the system of example 3, wherein the respective amplitude and time threshold for each of the plurality of clip detectors are defined based on a Complementary Cumulative Distribution Function (CCDF) analysis.

Example 5 includes the system of any of examples 3-4, the multi-threshold programmable ALC controller further comprising: at least one IQ processor function configured to calculate a peak sample from the complex IQ samples of the attenuated communication signal, wherein the peak sample is evaluated by one or more of the plurality of clip detectors to determine when their respective amplitude and time threshold is exceeded.

Example 6 includes the system of example 5, wherein the at least one IQ processor function further calculates a Received Signal Strength Indicator (RSSI) value, wherein at least one of the plurality of clip detectors evaluates the RSSI value to determine when their respective amplitude and time threshold is exceeded.

Example 7 includes the system of any of examples 3-6, wherein the analog communications signal comprises a communications signal for a single band and the peak sample is calculated from the complex IQ samples as a function of $I^2+Q^2$.

Example 8 includes the system of any of examples 3-7, wherein the analog communications signal comprises a communications signal comprising a first signal band x and a second signal band y and the peak sample is calculated from the complex IQ samples as a function of $I_{(x+y)}^2 + Q_{(x+y)}^2$.

Example 9 includes the system of any of examples 3-8, wherein the each of the plurality of clip detectors of the programmable attenuation manager comprise at least a level detector and a counter, wherein the counter determines when an input to the respective clip detectors exceeds an amplitude level for at least a defined number of samples, wherein the amplitude level and the define number of sampled are determined from the amplitude and time threshold.

Example 10 includes the system of any of examples 3-9, wherein the multi-threshold programmable ALC controller further comprises: an ALC state machine coupled to the programmable attenuation manager, wherein one or more states of the ALC state machine are adjusted based on outputs from the plurality of clip detectors of the programmable attenuation manager, wherein the attenuation adjustment signal to the digital step attenuator is generated by the ALC state machine as a function of the one or more states of the ALC state machine.

Example 11 includes the system of example 10, wherein the ALC state machine determines which of the plurality of clip detectors triggers an ALC adjustment and drives the digital step attenuator a number of steps as a function of the determination.

Example 12 includes the system of any of examples 10-11 comprising a plurality of signal paths of the at least one signal path; wherein the multi-threshold programmable ALC controller comprises a plurality of ALC state machines each associated with a corresponding digital step attenuator, wherein each of the plurality of ALC state machines communicate with their corresponding digital step attenuator through a common bus; wherein access to the bus is controlled by a gate keeper coupled to each of the ALC state machines, wherein the gate keeper controls access to the bus base on a dynamic priority list, wherein the gate keeper dynamically updates the dynamic priority lists such that the ALC state machine which has communicated a most recent ALC adjustment to its corresponding digital step attenuator is assigned to a lowest priority position on the dynamic priority list.

Example 13 includes the system of any of examples 1-12, wherein the multi-threshold programmable ALC controller further comprises a headroom detector, wherein the multi-threshold programmable ALC controller drives the digital step attenuator to decrease attenuation based at least in part on a determination that none of the plurality of clip detectors exceed their respective amplitude and time threshold.

Example 14 includes the system of any of examples 1-13, wherein the multi-threshold programmable ALC controller is implemented within a radio point of a Centralized cellular radio access network (C-RAN).

Example 15 includes the system of any of examples 1-14, wherein the multi-threshold programmable ALC controller is implemented within a remote antenna unit of a distributed antenna system (DAS).

Example 16 includes an automatic level control (ALC) system for communications signals, the system comprising: a multi-threshold programmable ALC controller; and a plurality of signal paths that each include: a digital step attenuator configured to receive an analog communications signal and attenuate the communications signal in response to an attenuation adjustment signal from the multi-threshold programmable ALC controller; and an analog-to-digital converter configured to receive the communications signal as attenuated by the digital step attenuator, wherein the multi-threshold programmable ALC controller receives complex IQ samples of the attenuated communication signal; wherein the multi-threshold programmable ALC controller comprises a plurality of clip detectors that function in parallel, wherein each of the plurality of clip detectors are programmed with a respective amplitude and time threshold, wherein based on which of the plurality of clip detectors determine that the complex IQ samples exceed their respective amplitude and time threshold, the multi-threshold programmable ALC controller generates the attenuation adjustment signal to the digital step attenuator; a bus that communicatively couples the multi-threshold programmable ALC controller to each of the digital step attenuators; a gate keeper that controls access to the bus from the multi-threshold programmable ALC controller based on a dynamic priority list that reflects which of the digital step attenuators most recently received an attenuation adjustment signal.

Example 17 includes the system of example 16, wherein the gate keeper adjusts the dynamic priority list to assign a lowest priority to a digital step attenuator that most recently received the attenuation adjustment signal.

Example 18 includes the system of any of examples 16-17, wherein the multi-threshold programmable ALC controller comprises: a processor; and a programmable attenuation manager that includes the plurality of clip detectors, wherein the programmable attenuation manager configures the respective amplitude and time threshold for each of the plurality of clip detectors based on input from the processor; at least one IQ processor function configured to calculate a peak sample from the complex IQ samples of the attenuated communication signal, wherein the peak sample is evaluated by one or more of the plurality of clip detectors of the programmable attenuation manager to determine when their respective amplitude and time threshold is exceeded; an ALC state machine coupled to the programmable attenuation manager, wherein one or more states of the ALC state machine are adjusted based on outputs from the plurality of clip detectors of the programmable attenuation manager, wherein the attenuation adjustment signal to the digital step attenuator is generated by the ALC state machine as a function of the one or more states of the ALC state machine.

Example 19 includes the system of example 18, wherein the at least one IQ processor function further calculates a Received Signal Strength Indicator (RSSI) value, wherein at least one of the plurality of clip detectors evaluates the RSSI value to determine when their respective amplitude and time threshold is exceeded.

Example 20 includes the system of any of examples 18-19, wherein the analog communications signal comprises a communications signal for a single band and the peak sample is calculated from the complex IQ samples as a function of $I^2+Q^2$.

Example 21 includes the system of any of examples 18-20, wherein the analog communications signal comprises a communications signal comprising a first signal band x and a second signal band y and the peak sample is calculated from the complex IQ samples as a function of $I_{(x+y)}^2 + Q_{(x+y)}^2$.

Example 22 includes the system of any of examples 16-21, wherein the respective amplitude and time threshold for each of the plurality of clip detectors are defined based on a Complementary Cumulative Distribution Function (CCDF) analysis.

In various alternative embodiments, system and/or device elements, method steps, or example implementations described throughout this disclosure (such as any of the ALC controllers, processor, couplers, step attenuators, analog to digital converter, IQ processor function, programmable attenuation manager, ALC state machine, gate keeper, user device, network, radio point, base station, host unit, remote antenna unit, clip detectors, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited, to computer-executable instructions executed by computer system processors and hardware description languages such as Very High-Speed Integrated Circuit (VHSIC) Hardware Description Language (VHDL).

As used herein, terms such as "controller", "processor", "coupler", "step attenuator", "converter", "IQ processor function", "programmable attenuation manager", "state machine", "gate keeper", "user device", "network", "radio point", "base station", "host unit", "remote antenna unit", "clip detector", and the like, each refer to non-generic device elements as would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An automatic level control (ALC) system for communications signals, the system comprising:
   a programmable ALC controller; and
   at least one signal path, wherein each signal path includes:
      a digital step attenuator configured to receive an analog communications signal and attenuate the analog communications signal in response to an attenuation adjustment signal from the programmable ALC controller; and
      an analog-to-digital converter configured to receive the analog communications signal as attenuated by the digital step attenuator and generate samples of an attenuated analog communications signal, wherein the programmable ALC controller receives the samples;
   wherein the programmable ALC controller comprises at least one clip detector, wherein the at least one clip detector is programmed with a respective amplitude and time threshold;
   wherein based on when the at least one clip detector determines that the samples exceed the respective amplitude and time threshold, the programmable ALC controller generates the attenuation adjustment signal to the digital step attenuator.

2. The system of claim 1, wherein the digital step attenuator is configured to receive the analog communications signal from an uplink path of a radio point of a centralized radio access network (C-RAN).

3. The system of claim 1, wherein the digital step attenuator is configured to receive the analog communications signal from an uplink path of a radio antenna unit of a distributed antenna system (DAS).

4. The system of claim 1, wherein the analog-to-digital converter is configured to convert the attenuated analog communications signal into complex I/Q samples provided as input to the programmable ALC controller.

5. The system of claim 1, wherein the programmable ALC controller comprises:
   a processor; and
   a programmable attenuation manager that includes the at least one clip detector, wherein the programmable attenuation manager configures the respective amplitude and time threshold based on input from the processor.

6. The system of claim 5, the programmable ALC controller further comprising:
   at least one processor function configured to calculate a peak sample from the samples of the attenuated analog communications signal, wherein the peak sample is evaluated by the at least one clip detector to determine when the respective amplitude and time threshold is exceeded.

7. The system of claim 6, wherein the at least one processor function further calculates a Received Signal Strength Indicator (RSSI) value, wherein the at least one clip detector evaluates the RSSI value to determine when the respective amplitude and time threshold is exceeded.

8. The system of claim 6, wherein the analog communications signal comprises a communications signal for a single band;
wherein the samples of the attenuated analog communications signal comprise complex IQ samples and the peak sample is calculated from the complex IQ samples as a function of $I^2+Q^2$.

9. The system of claim 6, wherein the analog communications signal comprises a communications signal comprising a first signal band x and a second signal band y; and
wherein the samples of the attenuated analog communications signal comprise complex IQ samples and the peak sample is calculated from the complex IQ samples as a function of $I_{(x+y)}^2+Q_{(x+y)}^2$.

10. The system of claim 5, wherein the programmable attenuation manager further comprises a headroom detector, wherein the programmable ALC controller drives the digital step attenuator to decrease attenuation based at least in part on a determination that the at least one clip detector does not exceed the respective amplitude and time threshold.

11. The system of claim 1, wherein the at least one clip detector of the programmable ALC controller comprises a plurality of clip detectors.

12. A method for automatic level control (ALC) system for communications signals, the method comprising:
attenuating an analog communications signal in response to an attenuation adjustment signal;
generating samples of an attenuated analog communications signal;
receiving the samples at a programmable ALC controller, wherein the programmable ALC controller comprises at least one clip detector programmed with a respective amplitude and time threshold;
based on when the at least one clip detector determines that the samples exceed their respective amplitude and time threshold, generating the attenuation adjustment signal.

13. The method of claim 12, further comprising: receiving the analog communications signal from an uplink path of a radio point of a centralized radio access network (C-RAN).

14. The method of claim 12, further comprising: receiving the analog communications signal from an uplink path of a radio antenna unit of a distributed antenna system (DAS).

15. The method of claim 12, wherein the at least one clip detector of the programmable ALC controller comprises a plurality of clip detectors.

16. The method of claim 12, further comprising:
converting the attenuated analog communications signal into complex I/Q samples provided as input to the programmable ALC controller.

17. The method of claim 12, wherein the programmable ALC controller comprises:
a processor; and
a programmable attenuation manager that includes the at least one clip detector, wherein the programmable attenuation manager configures the respective amplitude and time threshold based on input from the processor.

18. The method of claim 17, the programmable ALC controller further comprising:
at least one processor function configured to calculate a peak sample from the samples of the attenuated analog communications signal, wherein the peak sample is evaluated by the at least one clip detector to determine when the respective amplitude and time threshold is exceeded.

19. The method of claim 12, wherein the analog communications signal comprises a communications signal for a single band;
wherein the samples of the attenuated analog communications signal comprise complex IQ samples and a peak sample is calculated from the complex IQ samples as a function of $I^2+Q^2$.

20. The method of claim 12, wherein the analog communications signal comprises a communications signal comprising a first signal band x and a second signal band y; and
wherein the samples of the attenuated analog communications signal comprise complex IQ samples and a peak sample is calculated from the complex IQ samples as a function of $I_{(x+y)}^2+Q_{(x+y)}^2$.

* * * * *